(12) United States Patent
Perkins

(10) Patent No.: US 6,188,729 B1
(45) Date of Patent: Feb. 13, 2001

(54) METHOD AND APPARATUS FOR EFFECTING SEAMLESS DATA RATE CHANGES IN A VIDEO COMPRESSION SYSTEM

(75) Inventor: Michael G. Perkins, Lawrenceville, GA (US)

(73) Assignee: Scientific-Atlanta, Inc., Norcross, GA (US)

( * ) Notice: Under 35 U.S.C. 154(b), the term of this patent shall be extended for 0 days.

(21) Appl. No.: 08/041,446

(22) Filed: Apr. 1, 1993

(51) Int. Cl.[7] ........................................................ H04N 7/30

(52) U.S. Cl. ................................. 375/240.2; 375/240.22

(58) Field of Search ................................... 348/388, 390, 348/397, 399, 422; 370/84, 108; 341/61; 375/31, 33, 240, 240.01, 240.03, 240.12, 240.18, 240.2, 240.22; H04N 7/130, 7/133, 7/30

(56) References Cited

U.S. PATENT DOCUMENTS

| | | | |
|---|---|---|---|
| 4,077,053 | * 2/1978 | Ishiguro | 375/31 |
| 4,396,937 | * 8/1983 | Reitmeier et al. | 375/33 |
| 4,517,596 | * 5/1985 | Suzuki | 375/33 |
| 5,172,228 | 12/1992 | Israelsen | 358/133 |
| 5,216,503 | * 6/1993 | Paik et al. | 348/390 |
| 5,235,418 | * 8/1993 | Lucas | 348/422 |
| 5,243,419 | * 9/1993 | Faryar et al. | 370/84 |
| 5,253,059 | * 10/1993 | Ansari et al. | 348/390 |

* cited by examiner

Primary Examiner—Richard Lee
(74) Attorney, Agent, or Firm—John Eric West; Kenneth M. Massaroni; Hubert J. Barnhardt

(57) ABSTRACT

A video compression system comprises a control computer 52; a plurality of encoders 54, 56, 58; a plurality of encoder buffers 60, 62, 64; a multiplexor 66; a data channel 70; a demultiplexor 80; a decoder buffer 82; a decoder 84; and display 86. The control computer controls the encoders and the multiplexor 66 to avoid overflows and underflows of data provided to the decoder buffer 82.

12 Claims, 3 Drawing Sheets

METHOD AND APPARATUS FOR EFFECTING SEAMLESS DATA RATE CHANGES IN A VIDEO COMPRESSION SYSTEM

FIELD OF THE INVENTION

The present invention relates generally to the fields of digital television and video compression, and more particularly relates to methods and apparatus for effecting seamless rate changes in a video compression system employing buffers.

BACKGROUND OF THE INVENTION

The background of the present invention is described herein in the context of pay television systems, such as cable television and direct broadcast satellite (DBS) systems. However, the invention is by no means limited thereto except as may be expressly set forth in the accompanying claims.

In the pay television industry, programmers produce programs for distribution to various remote locations. A "program" may consist of video, audio, and/or other related services, such as closed-captioning and teletext services. A programmer supplies these services, e.g., via satellite, to individual subscribers and/or cable television operators. Typically, many separately encoded, compressed programs are multiplexed together and sent over a data channel to cable television operators. The cable operators receive the multiplex and select the programs/services they wish to distribute to their subscribers. The selected programs are then transmitted to the individual subscribers via a coaxial cable distribution network.

In the past, pay television systems have operated in the analog domain. Recently, however, the pay television industry has begun to move toward all digital systems wherein, prior to transmission, the analog program signals are converted to digital signals. Digital signal transmission offers the advantage that digital data can be processed at both the transmission and reception ends to improve picture quality. In addition, digital data compression techniques can achieve high signal compression ratios. Digital compression allows a larger number of individual services to be transmitted within a fixed bandwidth. Bandwidth limitations are imposed by both satellite transponders and coaxial cable distribution networks, and therefore digital compression is extremely advantageous.

FIG. 1 depicts an exemplary application of a vector quantization image compression system wherein image data is communicated from a point of origin 12 to receiving locations 14, 16. (It should be noted that the invention is not limited to use in a vector quantization system, or any other particular type of encoding system. For example, the invention may be employed in a system using discrete cosine transform (DCT) encoding, such as an MPEG system.) The point of origin 12 might include a source 20 of program material that supplies movies and the like in analog form to an encoder 22 for digitization and data compression by vector quantization. Compressed digital data is transmitted to a satellite 18 via transmitter 24 for reception by a plurality of earth stations 14, 16. The earth stations 14, 16 may be the head-end of a cable television distribution system of the type which receives signals from the satellite 18 and distributes them to a plurality of subscribers via coaxial cable or optical fiber. Alternatively, one or more of the earth stations may be DBS (direct broadcast satellite) subscribers who receive signals directly from the satellite 18. The cable head-end installation 14 may receive the data transmitted by the station 12 via a receiver 26 and then employ an on-site decoder 28 for decompressing the received data and converting the same back to analog form. Another on-site apparatus 30 may convert the analog data to conventional NTSC signals for transmission over cable to subscribers in conventional form. Thus, in the case of cable head-end installation 14, the cable head-end operator distributes analog NTSC cable television signals to subscribers in conventional form. Further background on digital television can be found in U.S. patent application Ser. No. 968,846, Oct. 30, 1992, titled *System and Method for Transmitting a Plurality of Digital Services*, and U.S. Patent No. \_\_ (application Ser. No. 794,516, issued Dec. 15, 1992), titled *Image Compression Method and Apparatus Employing Distortion Adaptive Tree Search Vector Quantization*.

A problem with the prior art is caused by the fact that, when the program provider decides to change the data rate at which a given program is encoded and provided to cable operators, there is often a noticeable interruption in the picture received by the viewers that are watching that program. One reason for effecting such a rate change would be to increase the amount of data received by the cable operators and to thereby improve the quality of the television pictures received by the viewers. Typically, the program multiplex is provided to the data channel at a fixed rate, although the individual programs composing the multiplex are compressed with a variable rate coding scheme. This means that buffers are required at the encoder(s) and decoder (s). If the encoding rate $R_i$ of one program is changed in a system with a fixed rate data channel, the encoding rates of all other programs must be adjusted such that the total data rate R is fixed (where R equals the sum of the data rates of the individual program channels). As programs are encoded by a program provider prior to being sent to a cable operator, the encoding rate for each program must be controlled to avoid decoder buffer overflows and underflows, which, if allowed to occur, would produce a noticeable interruption in the viewers' television pictures.

Accordingly, a primary goal of the present invention is to provide methods and apparatus whereby the encoding rate is adjusted automatically to avoid any overflows or underflows in the viewers' decoder buffers.

SUMMARY OF THE INVENTION

The present invention provides methods and apparatus especially suited for video compression systems (e.g., pay television systems) comprising at least one encoder for compressing program data, an encoder buffer, and one or more decoders connected to associated decoder buffers. An example of such a system is described below in connection with a detailed description of one prefer red embodiment of the invention. The present invention will most often be employed by program providers th at send compressed digital program data to cable operators. The cable operators select the particular programs to provide to their viewers. The present invention allows the program provider to change the rate at which program data is encoded and transmitted to cable operators such that the rate change is seamless, i.e., such that the decoder buffers neither overflow nor underflow.

A method for operating a video compression system in accordance with the present invention comprises the steps of (a) changing the rate at which an encoder provides data to an encoder buffer from a first rate R to a second rate R'; and (b) maintaining the encoder buffer occupancy $b_e(t)$ such that the following conditions are maintained: (1) prior to time $T_O-T_d$, $\max\{0, RT_d-B_d\} \leq b_e(t) \leq \min\{B_e, RT_d\}$; and (2) after time $T_O$, $\max\{0, R'T_d-B_d\} \leq b_e(t) \leq \min\{B_3, R'T_d\}$; and (3) during the time $T_O-T_d \leq t \leq T_O$, $\max\{0, RT_O-Rt+R't+R'T_d-R'T_O-B_d\} \leq b_e(t) \leq \min\{B_e, RT_O-Rt+R't+R'T_dR'T_O\}$; wherein t represents time, $T_O$ represents the time at which the data rate changes from R to R', $B_d$ represents the maximum capacity of the decoder buffer, and $T_d$ represents the delay caused by the encoder and decoder buffers. The value of $T_d$ will typically be determined by the startup strategy used by the system; it is the delay between the time a compressed picture enters the decoder and the time the picture is removed from the decoder buffer for decompression and display.

A presently preferred implementation of the present invention further comprises the steps of multiplexing the data from the encoder buffer with data from at least one other encoder buffer, and transmitting a multiplex comprising the multiplexed data over a data channel to the decoder buffer. The invention may be used in connection with vector quantization and DCT encoding schemes. Other schemes may be used as well.

The present invention also provides means for carrying out the inventive method summarized above.

In addition, the present invention provides a system for providing a plurality of programs to a cable operator or individual subscriber having means for selecting a desired program for viewing, a decoder and a decoder buffer providing the selected program to the decoder. The system comprises first and second encoders (although more than two encoders may be employed) each receiving program data; first and second encoder buffers respectively coupled to the first and second encoders; a multiplexor receiving data from the first and second encoders and outputting a multiplex to a data channel for reception by the cable operator or subscriber; and a control computer coupled to the first and second encoders and to the multiplexor, the controller comprising program means for changing the rates at which the encoders provide data to their encoder buffers and the encoder buffers provide data to the multiplexor. According to the invention, the control computer controls the occupancies of the encoder buffers such that the decoder buffer neither overflows nor underflows when the rate at which either encoder provides data to its buffer is changed from a first rate R to a second rate R'.

Other features of the present invention are described below.

DETAILED DESCRIPTION OF PREFERRED EMBODIMENTS

Figure 1:
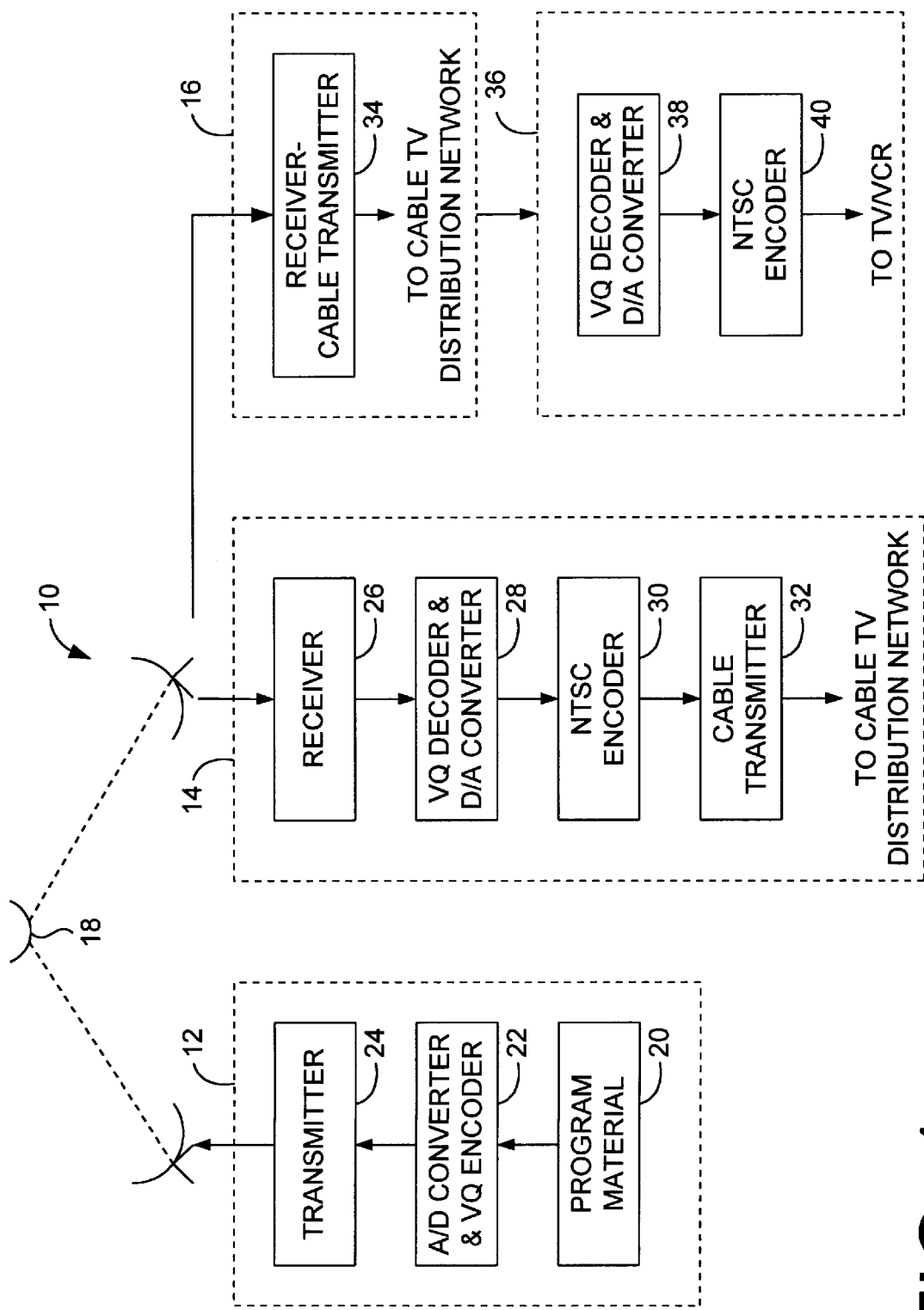
FIG. 1 is a block diagram of a pay television system.
Figure 2:
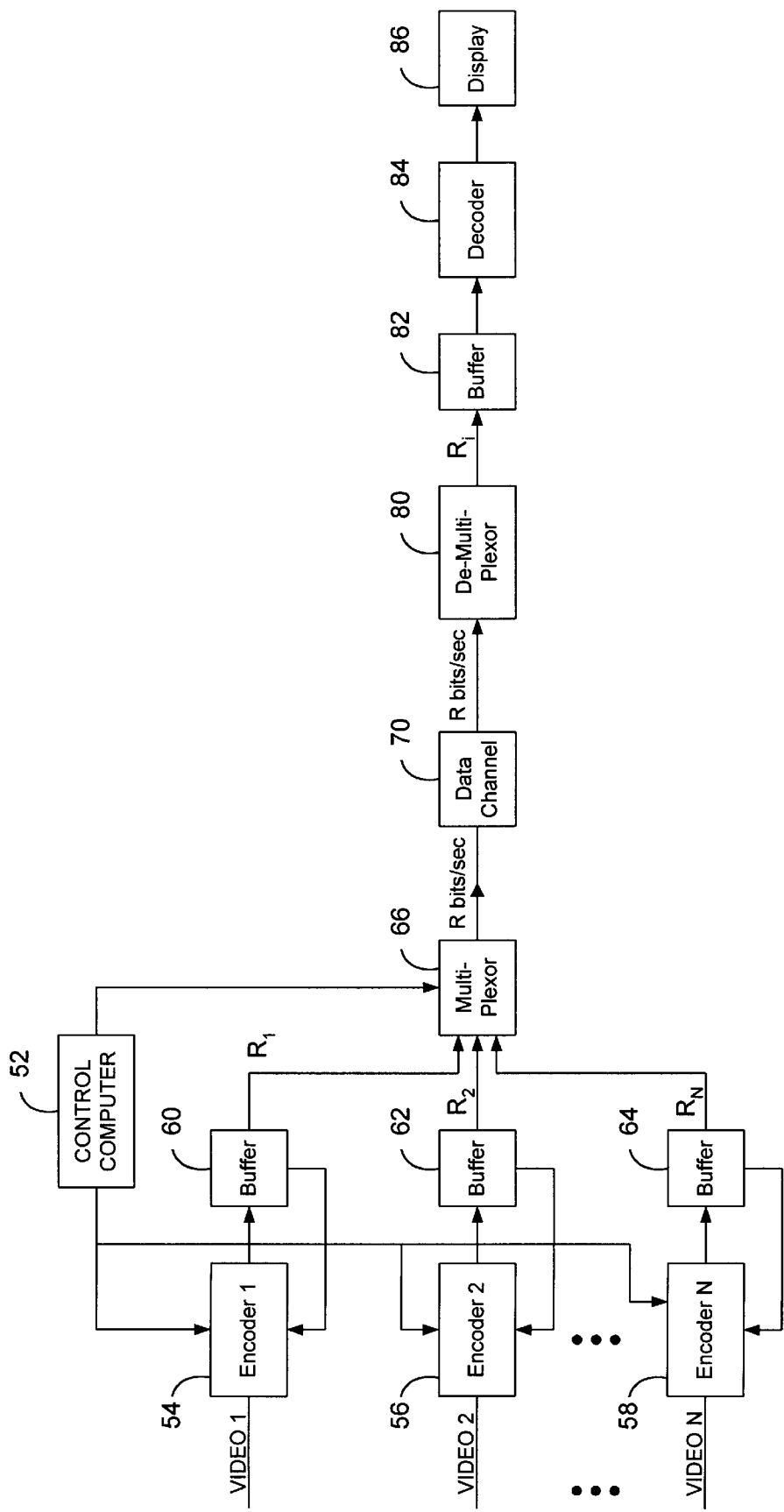
FIG. 2 is a block diagram of one embodiment of a video compression system in accordance with the present invention.

FIG. 2 is a block diagram of a video compression system in accordance with the present invention. The system includes a control computer 52; plurality of encoders 54, 56, 58; a plurality of encoder buffers 60, 62, 64; a multiplexor 66; a data channel 70; a demultiplexor 80; a decoder buffer 82; a decoder 84; and display 86. Of course, although only one is shown, there would normally be many additional multiplexor-decoder buffer-decoder-display combinations. In addition, the decoder 84 and display 86 may be contained in a television set, while the demultiplexor 80 and decoder buffer 82 may be located at the site of the cable operator or in a separate set top unit. As indicated in FIG. 2, the multiplexor 66 transmits data at a prescribed rate R to the data channel 70 and the demultiplexor 80 provides data to the decoder buffer 82 at the rate $R_j$, where the index i (i=1, 2, ... N) represents the selected channel. The present invention relates to the manner in which the control computer controls the encoders and multiplexor 66 to avoid overflows and underflows of data provided to the decoder buffer 82. Such control is particularly important when the rates $R_1, R_2, \ldots R_N$ at which the encoders provide data to their buffers (which are the same as the rates at which the buffers provide data to the multiplexor 66) are changed. Accordingly, this specification describes in detail the manner in which such overflows and underflows may be avoided. The other components are known in the art and thus are not described in detail herein.

Assume a variable-rate compression scheme and a variable-rate data channel are employed. In a representative case, the encoder buffer occupancy is given by:

$$b_e(0) = 0$$

$$b_e(t) = \int_0^t e(\tau)d\tau, \text{ for } 0 \leq t \leq T_e$$

$$b_e(T_e) = \frac{B_e}{2}$$

$$b_e(t) = \frac{B_e}{2} + \int_{T_e}^t e(\tau)d\tau - \int_{T_e}^t R(\tau)d\tau, \text{ for } t \geq T_e$$

In the above equations, $e(\tau)$ is the instantaneous bit rate out of the encoder, where $\tau$ is a time variable used in the integration; $T_e$ is the time at which the multiplexor 66 starts reading data out of the buffer; $B_e$ is the maximum capacity of the encoder buffer, in bits; and $R(\tau)$ is the rate at which the multiplexor 66 reads data from the buffer for output to the data channel 70 (this is preferably a constant). Similarly, the decoder buffer occupancy equations are:

$$b_d(0) = 0, \text{ for } t \leq T_e$$

$$b_d(t) = \int_{T_e}^t R(\tau)d\tau, \text{ for } T_e \leq t \leq T_d$$

$$b_d(T_e) = \frac{B_d}{2}$$

$$b_d(t) = \frac{B_d}{2} + \int_{T_d}^t R(\tau)d\tau - \int_0^{t-T_d} e(\tau)d\tau, \text{ for } t \geq T_d$$

In the decoder equations, the terms have meanings similar to their counterparts in the encoder equations. The decoder equations are based on the premise that the first bits removed from the buffer at the decoder are the first bits added to the buffer at the encoder, and that the bits are removed at the same rate as they are added, taking into account the delay.

The present inventor has determined that the sum of the encoder and decoder buffer occupancies is a constant when the encoder is operating at a fixed rate and the effects of encoder and decoder startup have disappeared, i.e., when the encoder-decoder pair is in its "steady-state" mode. Of course, for this condition to be true, one must take into account the delay through the system. That is, if we take the decoder buffer occupancy at some arbitrary time $t_O$, we must take the encoder buffer occupancy at $t_O-T_d$, where $T_d$ is the delay experienced by the data as it travels from the encoder buffer to the decoder buffer. Accordingly, we are interested in the sum of the decoder and encoder occupancies, $b_d(t)+b_e(t-T_d)$, at $t \geq T_d$ and $t-T_d \geq T_e$, or $t \geq T_d+T_e$.

It is apparent from the above equations that this sum is given by:

$$b_d(t) + b_e(t-T_d) = \frac{B_d}{2} + \int_{T_d}^{t} R(\tau)d\tau - \int_{0}^{t-T_d} e(\tau)d\tau +$$

$$\frac{B_e}{2} + \int_{T_e}^{t-T_d} e(\tau)d\tau - \int_{T_e}^{t-T_d} R(\tau)d\tau$$

$$= \frac{B_d}{2} + \frac{B_e}{2} - \int_{0}^{T_e} e(\tau)d\tau +$$

$$\int_{T_d}^{t} R(\tau)d\tau - \int_{T_e}^{t-T_d} R(\tau)d\tau$$

$$= \frac{B_d}{2} + \int_{T_d}^{t} R(\tau)d\tau - \int_{T_e}^{t-T_d} R(\tau)d\tau$$

$$= \frac{B_d}{2} + \int_{T_d}^{t-T_d} R(\tau)d\tau + \int_{t-T_d}^{t} R(\tau)d\tau -$$

$$\int_{T_e}^{T_d} R(\tau)d\tau - \int_{T_d}^{t-T_d} R(\tau)d\tau$$

From these equations, it follows that the sum of the encoder and decoder buffer occupancies can be expressed as $$b_d(t) + b_e(t-T_d) = \frac{B_d}{2} + \int_{t-T_d}^{t} R(\tau)d\tau - \int_{T_e}^{T_d} R(\tau)d\tau$$

$$= \int_{t-T_d}^{t} R(\tau)d\tau$$

When $R(\tau)$ is a constant R, this equation becomes: $b_d(t)+b_e(t-T_d)=RT_d$, where $RT_d$ is a constant. The decoder buffer occupancy can thus be expressed in terms of the encoder buffer occupancy and the instantaneous rate at which data is read from the encoder $R(\tau)$:

$$b_d(t) = \int_{t-T_d}^{t} R(\tau)d\tau - b_e(t-T_d), \text{ for } t \geq T_d + T_e$$

To prevent overflows and underflows, i.e., to ensure seamless rate changes, we require $$0 \leq \int_{t-T_d}^{t} R(\tau)d\tau - b_e(t-T_d) \leq B_d$$

From the above inequality, the encoder buffer occupancy should be constrained as follows:

$$b_e(t-T_d) \leq \int_{t-T_d}^{t} R(\tau)d\tau$$

$$b_e(t-T_d) \geq \int_{t-T_d}^{t} R(\tau)d\tau - B_d$$

The top constraint prevents underflows, i.e., the situation where $b_d(t)$ is less than or equal to zero, and the lower constraint prevents overflows, wherein $b_d(t)$ is greater than or equal to $B_d$.

By a change in variable ($t=t-T_d$), the above inequalities can be rewritten as $$b_e(t) \leq \int_{t}^{t+T_d} R(\tau)d\tau$$

$$b_e(t) \geq \int_{t}^{t+T_d} R(\tau)d\tau - B_d$$

In a constant bit rate operation, i.e., where $R(\tau)$ is a constant R, we have $b_e(t) \leq RT_d$ $b_e(t) \geq RT_d - B_d$ We also have the practical constraint $0 \leq b_e(t) \leq B_e$ Therefore, the encoder buffer occupancy constraint may be expressed as $\max(0, RT_d-B_d) \leq b_e(t) \leq \min(B_e, RT_d)$ Assume now that the data rate changes from R to R' at time $t = T_O$. For $t \leq T_O-T_d$, we have $\max(0RT_d-B_d) \leq b_e(t) \leq \min(B_e, RT_d)$ For $t \geq T_O$, we have $\max(0, R'T_d-B_d) \leq b_e(t) \leq \min(B_e, R'T_d)$ For $T_O-T_d \leq t \leq T_O$, we have $$b_e(t) \leq \min\left(B_e, \int_{t}^{T_0} R d\tau + \int_{T_0}^{t+T_d} R' d\tau\right)$$

$$b_e(t) \geq \max\left(0, \int_{t}^{T_0} R d\tau + \int_{T_0}^{t+T_d} R' d\tau - B_d\right)$$

Figure 3:
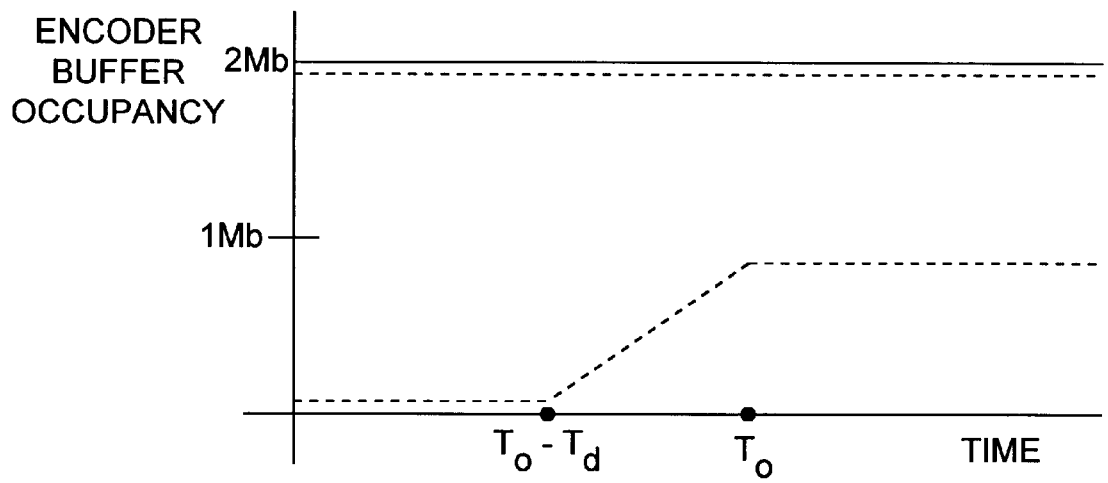
FIG. 3 depicts the constraints the system of FIG. 2 places on the encoder buffer occupancy as the compression rate is increased from 4 Mbps to 6 Mbps.
Figure 4:
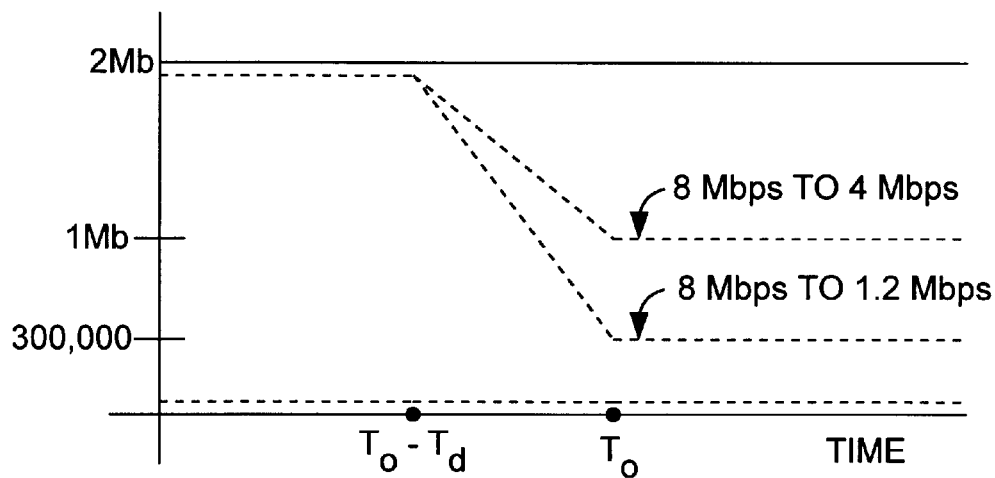
FIG. 4 depicts the constraints placed on the encoder buffer occupancy as the compression rate is decreased from 8 Mbps to 4 Mbps and to 1.2 Mbps.

These inequalities may be reduced to the following:

$b_e(t) \leq \min(B_e, RT_O-Rt+R't+R'T_d-R'T_O)$ $b_e(t) \geq \max(0, RT_O-Rt+R't+R'T_d-R'T_O-B_d)$ The encoder buffer occupancy constraint expressed above is graphically represented by FIGS. 3 and 4. In the example of FIG. 3, the data rate is changed from R=4 Mbps to R'=6 Mbps, with $T_d$=½ sec. For $t \geq T_O$, we have $R'T_d-B_d$=1 Mb, or $R'T_d$=3 Mb. Therefore, the encoder buffer occupancy must be controlled to lie between the broken lines to ensure that the rate change is seamless.

FIG. 4 represents examples in which the rate changes from R=8 Mbps to R'=4 Mbps and R'=1.2 Mbps, with $B_e=B_d$=2Mb and $T_d$=¼ sec. For the change to R'=4 Mbps, we have $RT_d$=2 Mb, $RT_d-B_d$=0, $R'T_d$=1 Mb, and $R'T_d-B_d$=−1 Mb. For the change to R'=1.2 Mbps, we have $R'T_d$=300,000 bits, and $R'T_d-B_d$=−1.7 Mb.

These examples show that the buffer size employed should be a function of the data rate. Smaller buffers are required at low rates. This allows the video delay through the system to be held constant at all data rates.

It should be understood that the scope of protection of the following claims is not intended to be limited to the specific embodiment described above, except where the claims are expressly so limited. For example, the invention may be applied in non-digital television systems wherein data is sent from an encoder to a decoder via buffers and where it is important to maintain the decoder buffer occupancy within predetermined limits. Such applications will become apparent to those skilled in the art after reading this specification.

I claim:

1. A method for operating a video compression system comprising at least one encoder providing data to an encoder buffer and a decoder taking data from a decoder buffer, comprising the steps of:
   (a) changing the rate at which the encoder provides data to the encoder buffer from a first rate R to a second rate R'; and
   (b) maintaining an encoder buffer occupancy $b_e(t)$ such that: (1) prior to time $T_O-T_d$, $\max\{0, RT_d-B_d\} \leq b_e(t) \leq \min\{B_e, RT_d\}$; and (2) after time $T_O$, $\max\{0, R'T_d-B_d\} \leq b_e(t) \leq \min\{B_e, R'T_d\}$; and (3) during the time $T_O-T_d \leq t \leq T_O$, $\max\{0, RT_O-Rt+R't+R'T_d-R'T_O-B_d\} \leq b_e(t) \leq \min\{B_e, RT_O-Rt+R't+R'T_d-R'T_O\}$; wherein t represents time, $T_O$ represents the time at which the data rate changes from R to R', $B_d$ represents the maximum capacity of the decoder buffer, $B_e$ represents the maximum capacity of the encoder buffer, and $T_d$ represents the delay caused by the encoder and decoder buffers.

2. The method recited in claim 1, further comprising the steps of multiplexing the data from the encoder buffer with data from at least one other encoder buffer, and transmitting a multiplex comprising the multiplexed data over a data channel to the decoder buffer.

3. The method recited in claim 1, further comprising the step of encoding the data with the encoder and providing the encoded data to the encoder buffer.

4. The method recited in claim 3, wherein the encoding comprises compressing the data with a vector quantization process.

5. The method recited in claim 3, wherein the encoding comprises compressing the data with a discrete cosine transform process.

6. The method recited in claim 1, further comprising the steps of: encoding the data with the encoder and providing the encoded data to the encoder buffer, wherein the encoding comprises compressing the data with a vector quantization process; multiplexing the data from the encoder buffer with data from at least one other encoder buffer; and transmitting a multiplex comprising the multiplexed data over a data channel to the decoder buffer.

7. The method recited in claim 1, further comprising the steps of: encoding the data with the encoder and providing the encoded data to the encoder buffer, wherein the encoding comprises compressing the data with a discrete cosine transform process; multiplexing the data from the encoder buffer with data from at least one other encoder buffer; and transmitting a multiplex comprising the multiplexed data over a data channel to the decoder buffer.

8. An apparatus for operating a video compression system comprising at least one encoder providing data to an encoder buffer and a decoder taking data from a decoder buffer, comprising:
   (a) means for changing the rate at which the encoder provides data to the encoder buffer from a first rate R to a second rate R'; and
   (b) a control computer operatively coupled to said encoder and being programmed to control the rate at which the encoder provides data to the encoder buffer and to maintain an encoder buffer occupancy $b_e(t)$ such that: (1) prior to time $T_O-T_d$, $\max\{0, RT_d-B_d\} \leq b_e(t) \leq \min\{B_e, RT_d\}$; and (2) after time $T_O$, $\max\{0, R'T_d-B_d\} \leq b_e(t) \leq \min\{B_e, R'T_d\}$; and (3) during the time $T_O-T_d \leq t \leq T_O$, $\max\{0, RT_O-Rt+R't+R'T_d-R'T_O-B_d\} \leq b_e(t) \leq \min\{B_e, RT_O-Rt+R't+R'T_d-R'T_O\}$; wherein t represents time, $T_O$ represents the time at which the data rate changes from R to R', $B_d$ represents the maximum capacity of the decoder buffer, $B_e$ represents the maximum capacity of the encoder buffer, and $T_d$ represents the delay caused by the encoder and decoder buffers.

9. The apparatus recited in claim 8, further comprising means for multiplexing the data from the encoder buffer with data from at least one other encoder buffer, and transmitting a multiplex comprising the multiplexed data over a data channel to the decoder buffer.

10. The apparatus recited in claim 8, further comprising means for compressing the data before providing the data to the encoder buffer.

11. The apparatus recited in claim 8, further comprising: means for compressing the data with one of a vector quantization process or a discrete cosine transform process; means for multiplexing the data from the encoder buffer with data from at least one other encoder buffer; and means for transmitting a multiplex comprising the multiplexed data over a data channel to the decoder buffer. encoder provides data to its buffer is changed from a first rate R to a second rate R'.

12. A system for providing a plurality of programs to a cable operator or subscriber having means for selecting a desired program for viewing, a decoder and a decoder buffer providing the selected program to the decoder, comprising:
   (a) first and second encoders each receiving program data;
   (b) first and second encoder buffers respectively coupled to said first and second encoders;
   (c) a multiplexor receiving data from said first and second encoders and outputting a multiplex to a data channel for reception by said cable operator or subscriber; and
   (d) a control computer coupled to said first and second encoders and to said multiplexor, comprising program means for changing the rates at which the encoders provide data to their encoder buffers and the encoder buffers provide data to the multiplexor, and for controlling the occupancies of the encoder buffers such that the decoder buffer neither overflows nor underflows when the rate at which either encoder provides data to its buffer is changed from a first rate R to a second rate R';
   wherein said control computer maintains each encoder buffer occupancy $b_e(t)$ such that: (1) prior to time $T_O-T_d$, $\max\{0, RT_d-B_d\} < b_e(t) < \min\{B_e, RT_d\}$; and (2) after time $T_O$, $\max\{0, R'T_d-B_d\} < b_e(t) < \min\{B_e, R'T_d\}$; and (3) during the time $T_O-T_d < t < T_O$, $\max\{0, RT_O-Rt+R't+R'T_d-R'T_O-B_d\} < b_e(t) < \min\{B_e, RT_O-Rt+R't+R'T_d-R'T_O\}$; wherein t represents time, $T_O$ represents the time at which the data rate changes from R to R', $B_d$ represents the maximum capacity of the decoder buffer, $B_e$ represents the maximum capacity of the encoder buffer, and $T_d$ represents the delay caused by the encoder and decoder buffers.

* * * * *

UNITED STATES PATENT AND TRADEMARK OFFICE
CERTIFICATE OF CORRECTION

PATENT NO. : 6,188,729 B1
DATED : February 13, 2001
INVENTOR(S) : Perkins

It is certified that error appears in the above-identified patent and that said Letters Patent is hereby corrected as shown below:

Column 8,
Lines 29-31, delete "encoder provides data to its buffer is changed from a first rate R to a sencond rate R'."

Signed and Sealed this

Second Day of October, 2001

Attest:

*Nicholas P. Godici*

NICHOLAS P. GODICI
*Attesting Officer*   *Acting Director of the United States Patent and Trademark Office*